D. M. HARTSOUGH.
TRACTOR.
APPLICATION FILED OCT. 7, 1914.

1,139,414.

Patented May 11, 1915.
7 SHEETS—SHEET 1.

Fig. 1

WITNESSES
E.C. Skinkle
A. H. Opsahl

INVENTOR
D. Maurice Hartsough
BY HIS ATTORNEYS
Williamson Merchant

UNITED STATES PATENT OFFICE.

D. MAURICE HARTSOUGH, OF MINNEAPOLIS, MINNESOTA, ASSIGNOR TO BULL TRACTOR COMPANY, A CORPORATION OF MINNESOTA.

TRACTOR.

1,139,414. Specification of Letters Patent. Patented May 11, 1915.

Application filed October 7, 1914. Serial No. 865,463.

*To all whom it may concern:*

Be it known that I, D. MAURICE HARTSOUGH, a citizen of the United States, residing at Minneapolis, in the county of Hennepin and State of Minnesota, have invented certain new and useful Improvements in Tractors; and I do hereby declare the following to be a full, clear, and exact description of the invention, such as will enable others skilled in the art to which it appertains to make and use the same.

Particularly, my present invention has for its object to provide an extremely simple and highly efficient tractor of small cost, adapted to serve as a general utility tractor for agricultural purposes. For example, a tractor of this character is well adapted for use to draw two, three or more plows, or to haul loaded wagons, threshing machines, harvesters, and the like, either in the field or on the road. This simplified tractor has two traction wheels. The framework of the tractor is hung from and below the axis of the two wheels and carries its load so low down that it will normally be gravity held in an arighted position. The motive power is supplied by an explosive engine which is connected to the two traction wheels through a divided counter shaft, the sections of which are connected through a differential gear mechanism that is combined with friction brakes, operative to increase or decrease the speed of the one traction wheel over the other, at will, so that the tractor may be thereby steered when the tractor is used to operate plows or to draw various other loads.

The tractor is also provided with a rearwardly projecting steering device, acting, by engagement with the surface of the ground, as a rudder to steer the tractor and having means for laterally adjusting the same and holding it in any adjusted position. This steering device in one embodiment of the invention, as here shown, consists of a pivoted rearwardly extending bar equipped with a shoe or ground engaging member, with means for oscillating said bar so that it and its said shoe will serve as a rudder for use in steering the tractor with the shoe held in engagement with the ground under light, but sufficient, pressure to insure the steering action.

The invention also involves certain other important features, all of which will be hereinafter described and defined in the claims.

In the accompanying drawings which illustrate the improved tractor, like characters indicate like parts throughout the several views.

Referring to the drawings.

The two large traction wheels 1 are laterally spaced but axially alined and are journaled to bearings 2 secured on the intermediate portions of the inner and outer lifting beams or levers 3. The said beams 3 are arranged in pairs, two for each wheel, and at their rearwardly extended ends, the said beams are rigidly tied together in pairs by transverse tie plates 4. Otherwise stated, the said elements 2—4 form approximately U-shaped lifting frames that embrace the respective traction wheels. The front ends of the lifting beams 2 are pivoted on the sleeve-like ends of the bearings 5 that are rigidly secured to longitudinally extended bars of a main frame 6, which latter is made up of a multiplicity of longitudinal and transverse bars of channel or other commercial rolled form.

Screw-threaded raising and lowering rods 7 having heads at their upper ends, are swiveled in the central portions of the tie plates 4, and their depending ends have threaded engagement with nut blocks 8, which, as shown, are pivotally mounted in bearings 9, rigidly secured on the rear transverse bar of the main frame 6. Obviously, the main frame may be lowered and raised and set in different elevations, by adjustments of the screw rods 7, so as to increase or decrease the distance between the rear portion of the main frame 6 and the rear portions of the lifting frames 3—4.

Obviously, the means for vertically adjusting the frame relatively to the axis of the wheel are not essential to other features of my invention.

A transverse counter shaft 10, which is divided at 10ª, is journaled in the bearings 5, and in other suitable bearings not shown, on the main frame 6, and at its ends, is provided with pinions 11, preferably of the lantern gear type, which mesh with large internal ring gears 12 secured to the respective traction wheels 1. Here it should be noted that adjustments of the main frame, in respect to the lifting frames, as above noted, maintain the set distance between the axes of the traction wheels and the alined axis of the pinions 11, so that the latter are maintained always in proper mesh with the internal gears 12, which latter are, of course, concentric to the axes of the traction wheels.

The engine employed is preferably of the horizontally opposed internal combustion type and is indicated as an entirety by the numeral 13. The said engine is rigidly secured on the main frame 6 in such position that its weight is nearly counterbalanced over the axis of the traction wheels and in such position that its crank shaft 14 extends parallel to the axes of the traction wheels. At one end, the engine crank shaft 14 carries a clutch wheel 15 that also serves as a fly wheel. A clutch cone 16 coöperates with an internal conical clutch surface of the clutch wheel 15, and itself, is secured to one end of a long sleeve 17 that is loosely journaled, both for rotary and sliding movements on the extended end of the said engine crank shaft 14. At its outer end, this sleeve 17 has a circumferential groove 18 that is engaged by the prongs of a shipper lever 19. This shipper lever is intermediately fulcrumed to a bearing 20 rigid on the main frame 6, and is operated by means and in a manner which will be hereinafter explained. Mounted to slide on the sleeve 17, but keyed thereto, for rotation therewith, is a driving pinion 21 having a grooved hub engaged by one end of a shipper lever 22, which shipper lever has a lateral extension 23 pivoted to one of the bars of the main frame 6. The said shipper lever 22 is also operated by means, and in a manner hereinafter to be fully described.

The driving pinion 21 is adapted to be slid into and out of mesh with the master gear 24 of a differential gear mechanism. The hub of the master gear 24 is journaled on the abutting ends of the sections of the divided counter shafts 10, and it carries one or more loosely journaled pinions 25 that engage opposing beveled gears 26 secured one on each of the sections of the said counter shaft 10. Each gear 26 carries a frictional brake flange or drum 27 with each of which coöperates a brake band 28 anchored at one end to the main frame 6 and connected at its other end to a bell crank 29 pivoted on said main frame. The lower ends of the two bell cranks 29 are connected by links 30 to the lower ends of foot operated levers 31, suitably pivoted to the main frame 6 and standing with their upper ends in position to be engaged by the feet of the operator when seated on the operator's seat 32, which seat is supported from the rear central portion of the said main frame.

The rudder above briefly referred to, as illustrated comprises a bar 33 pivotally attached at its front end, to the central portion of the main frame 6, with freedom for lateral swinging movements. This bar 33, at its intermediate portion, rests upon a supporting yoke 34 secured to the main frame 6. At its rear end said bar 33 is provided with ground-engaging means 35, which, as shown, is made from a plate of sheet steel bent into approximately U-shape in cross section, with its flanges turned downward and affording runners. The flanges of the said shoe 35 are also provided, as shown, with vertical perforations 36, which adapt said runner to serve also as a coupling head for the bar 33. The bar 33 which carries the rudder or ground engaging means may also serve as a draw bar, but the guiding feature of the invention is not restricted to the form of rudder illustrated nor to its capability of serving also as a coupling-head.

Figure 2:
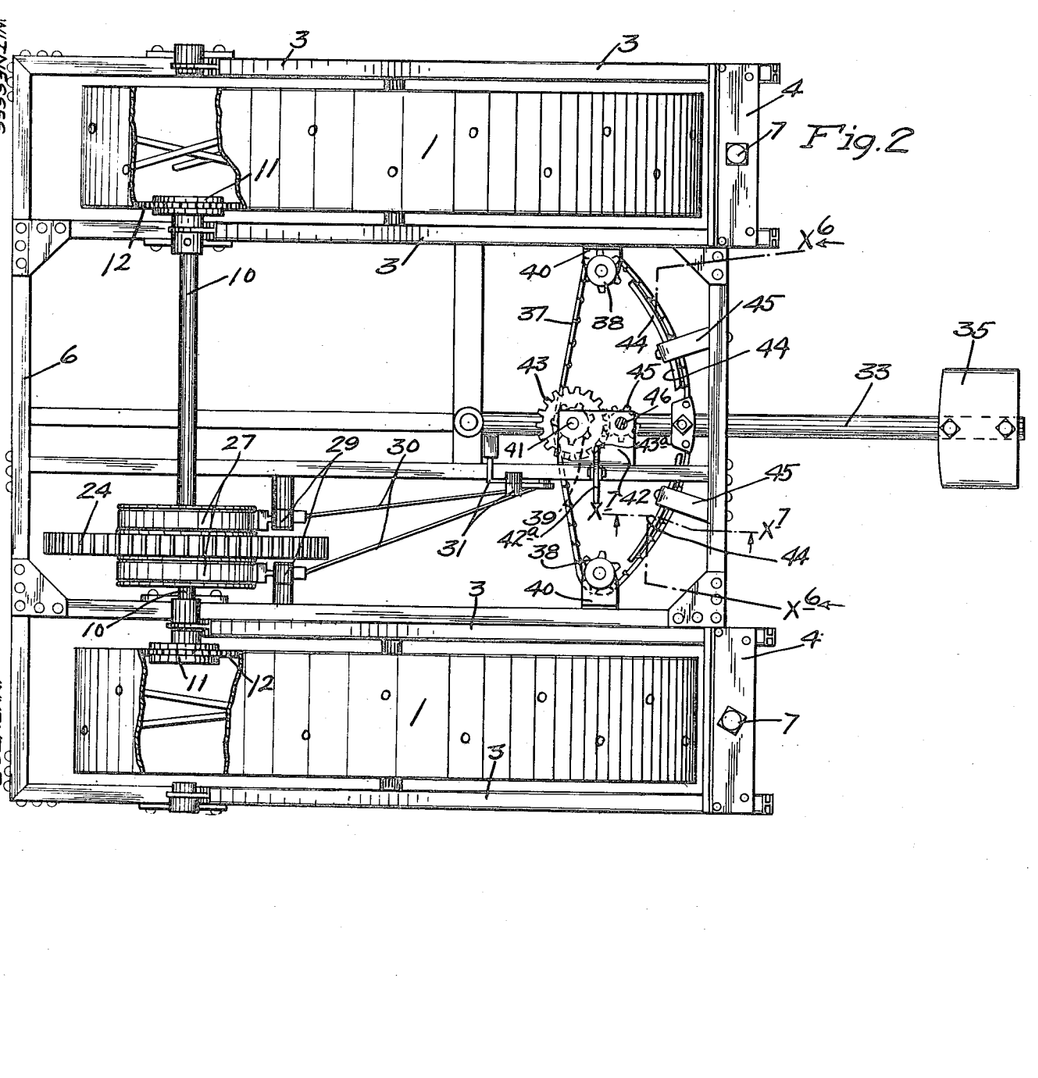
Fig. 2 is a plan view of the tractor with the engine and various other parts removed and with some parts broken away.
Figure 3:
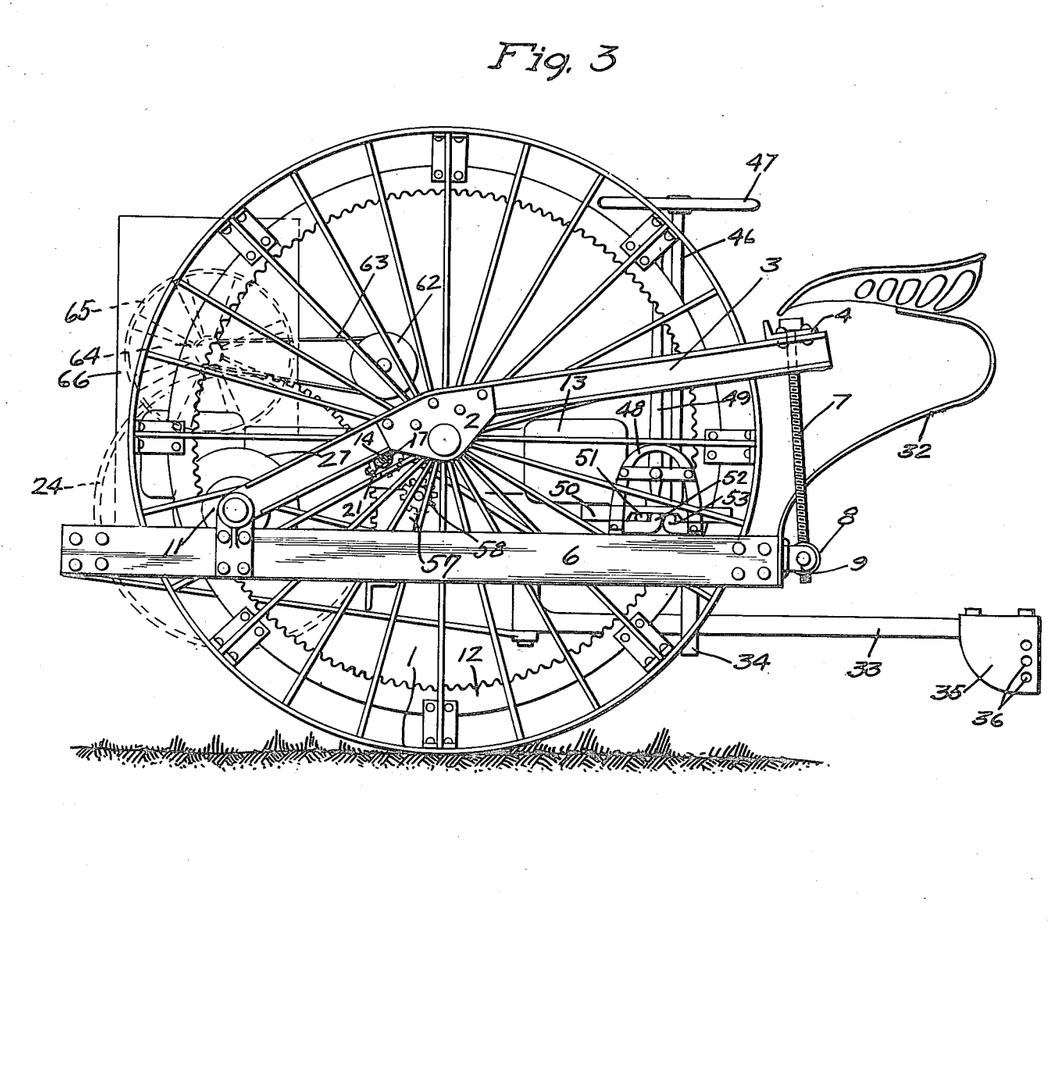
Fig. 3 is a left side elevation of the tractor.
Figure 4:
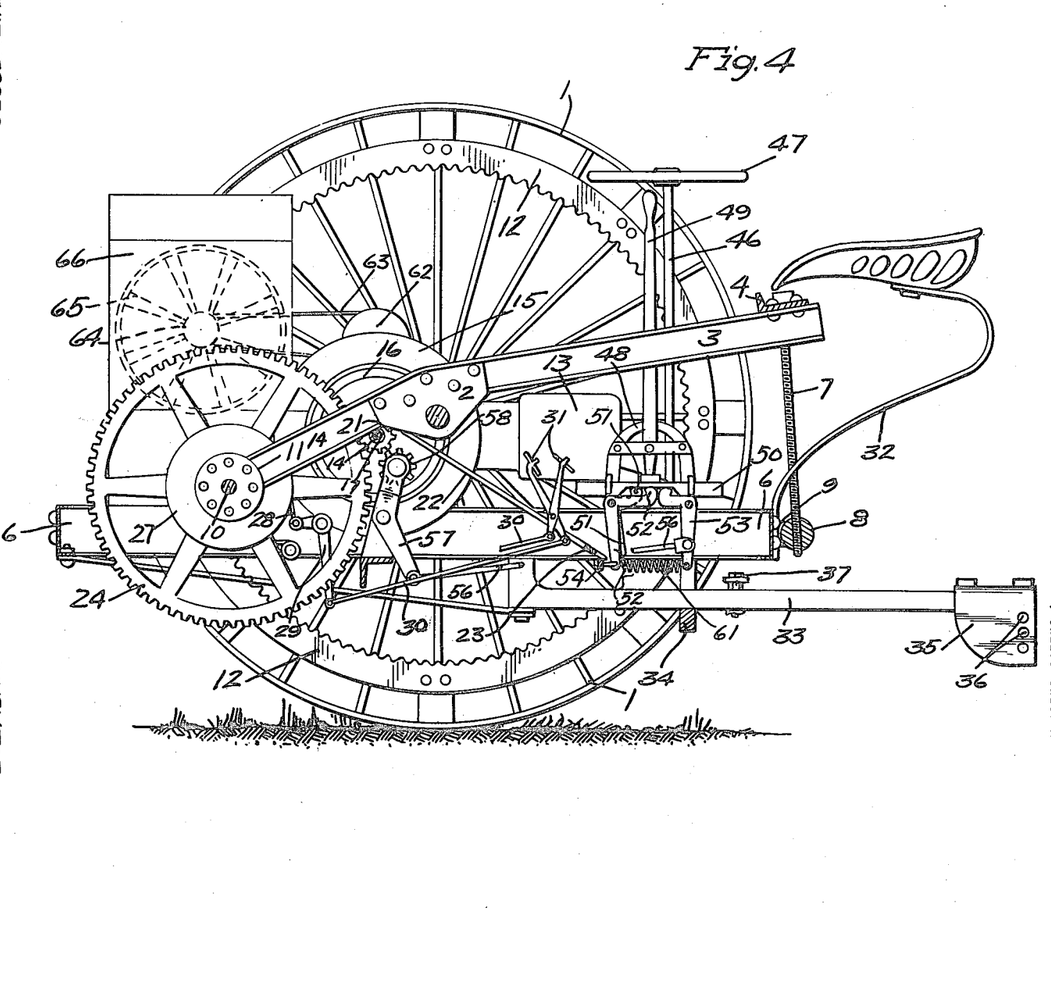
Fig. 4 is a vertical section taken approximately on the line $x^4$—$x^4$ of Fig. 1.
Figure 5:
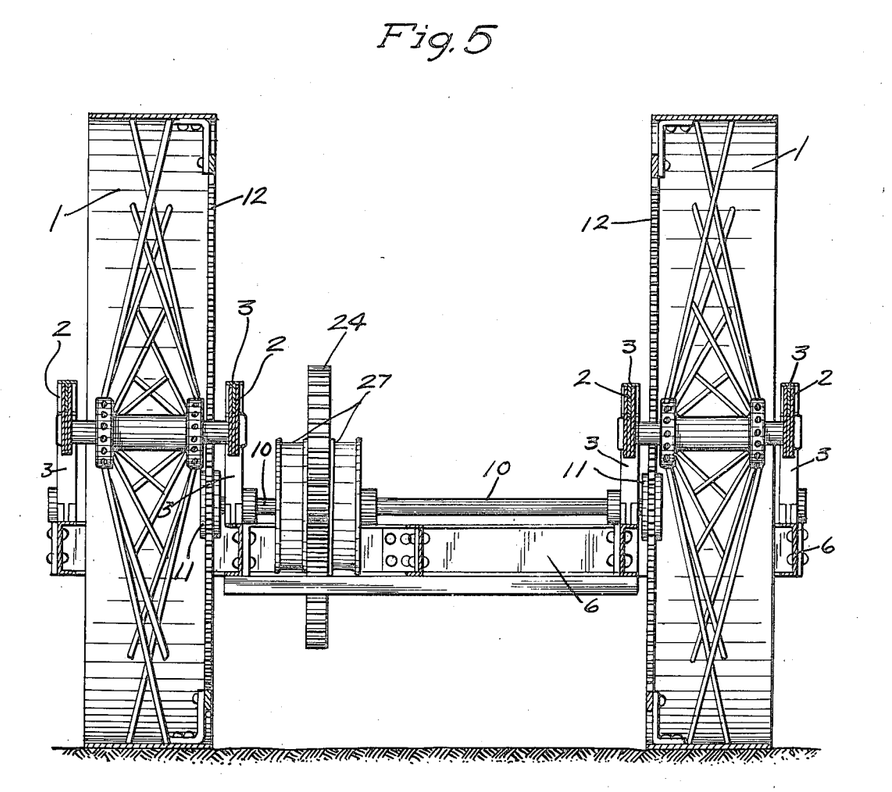
Fig. 5 is a section taken transversely through the tractor, approximately on the line of the axis of the wheels, but with some parts removed.
Figure 6:
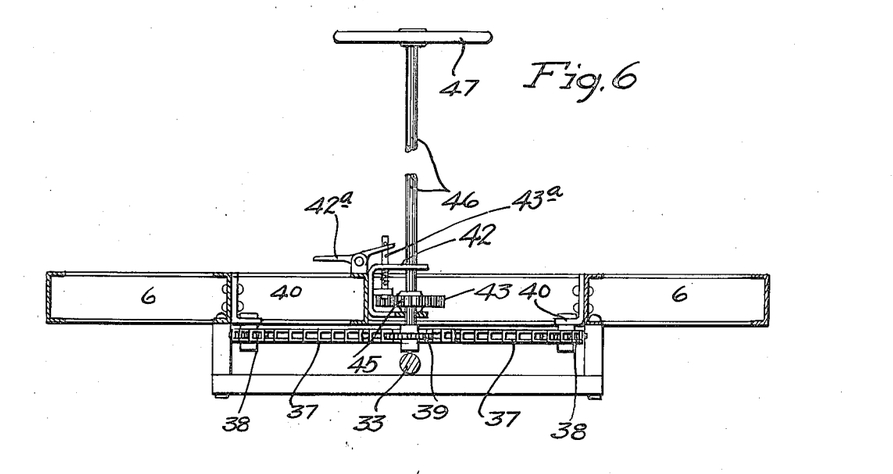
Fig. 6 is a detail in section approximately on the line $x^6$—$x^6$ on Fig. 2.
Figure 7:
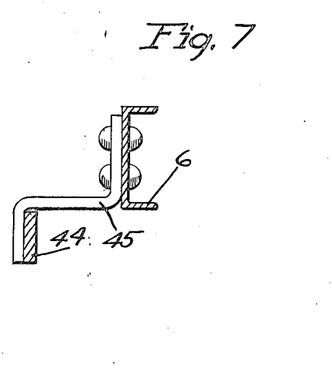
Fig. 7 is a detail in section on the line $x^7$—$x^7$ on Fig. 2.
Figure 8:
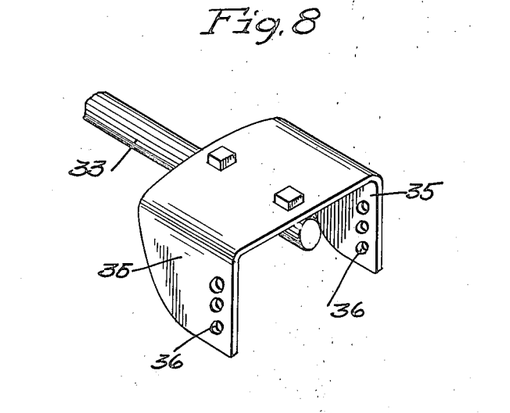
Fig. 8 is a perspective view showing the steering shoe or rudder and a portion of the bar to which it is connected.

As a simple and efficient means for laterally adjusting the bar 33 (see particularly Figs. 2 and 6), the intermediate portion of said bar is attached to an endless chain 37, as shown, of the sprocket type, which chain is arranged to run over idle guide sprockets 38 and over a driving sprocket 39. The idle guide sprockets 38 are journaled to bearing brackets 40 on the main frame 6, while the driving sprocket 39 is secured on the lower end of a supplemental steering post 41 that is journaled in a bearing bracket 42. This post 41, at its upper end portion, carries a spur gear 43. The rear portion of the chain 37 is also guided by segmental curved bars 44 supported by brackets 45, secured on the rear bar of the main frame 6.

The gear 43 meshes with a pinion 45 (see Fig. 2), which is secured to the lower end of the main steering post 46, which, at its lower end, is journaled in the bracket 42 and, at its upper end, is provided with an ordinary operating wheel 47.

As an important feature, I provide a lock for securing the draw bar 33 and its rudder or head against lateral oscillatory movements, in respect to the main frame. This lock may be applied in a great many different ways, but as shown, is in the form of a downwardly spring-pressed lock bolt 43ª suitably seated in the bearing bracket 42, with its lower end engaged with the teeth of the gear 43, but adapted to be raised by placing the foot on a lever 42ª, which, as shown, is pivotally mounted on the main frame and operatively connected to the upper end of said lock bolt.

The shipper levers 19—22, by means of which the friction clutch 15—16 and the driving pinion 21, respectively, may be operated, have already been noted, and I will now describe a novel controlling mechanism for operating the said two levers.

Located in front of the operator's seat and pivoted to a suitable bearing segment 48 on the main frame 6, is a lever 49 for controlling portions of the transmission mechanism. The lower end of this lever 49 is arranged to move forward and rearward a cam bar 50 that is mounted for forward and rearward sliding movements in bearings on the segment 48. The intermediate portion of this cam bar 50 is notched and formed in downwardly inclining cam surfaces that operate on the upper ends of three bell cranks, 51, 52 and 53, all of which bell cranks are pivoted to suitable bearings on the main frame 6. The two bell cranks 51—52 have coincident pivots, but the bell crank 53 is offset and reversed from the said two bell cranks 51—52.

The lower arm of the bell crank 51 engages the front end of the shipper lever 22. The lower arm of the bell crank 52 engages the under end of an intermediate bell crank 54 (see Fig. 1) pivoted to a bearing 55 on the main frame 6; and the other arm of this bell crank 54 engages the front end of the shipper lever 19. The lower arm of the bell crank 53 is connected by a rod 56 to the lower end of an arm 57 that is intermediately pivoted on a suitable bearing on the main frame 6. This arm 57, at its upper end, carries a wide-faced reversing pinion 58 (see Figs. 1-4).

When the upper end of the lever 49 is moved forward, the cam slide 50 will be moved rearward, and will first depress the upper arm of the bell crank 51, and, second, will depress the upper arm of the bell crank 52. This movement of the bell crank 51, acting through the shipper lever 22, will slide the pinion 21 into mesh with the master gear 24 of the differential gear mechanism; and the said movement of the bell crank 52, operating through the shipper lever 19, will move the sleeve 17 and clutch member 16 axially forward, so as to frictionally engage the clutch members 15—16. In this way it will be seen that the driving gears are thrown into mesh before the clutch is thrown into action, which is desirable to prevent stripping of teeth. When the pinion 21 is in mesh with the gear 24, the tractor will be driven forward. In this position of the parts shown in Fig. 1, the clutch members 15—16 are slightly separated; but in such position, the wide-faced reversing pinion 58 will, when thrown forward, simultaneously mesh with the pinion 21 and master gear 24, so that the tractor will then be driven backward. To cause this reverse action, the upper end of the lever 49 is moved rearward, which causes the slide 50 to be moved forward. The first effect of this forward movement of the slide 50 is to depress the upper arm of the bell crank 53, and, second, to depress the upper arm of the bell crank 52. Under this action, the reversing pinion 58 is first moved into mesh with the pinion 21 and gear 24, and then the clutch member 16 is engaged with the clutch member 15. Hence, in both forward and rearward driving actions, the gears are thrown into mesh before the clutch is thrown into action.

As shown, the levers 19—22 are retracted by tension springs 59 and 60, respectively, and the bell crank 53 is retracted by a tension spring 61 (see Figs. 1-4).

Figure 1:
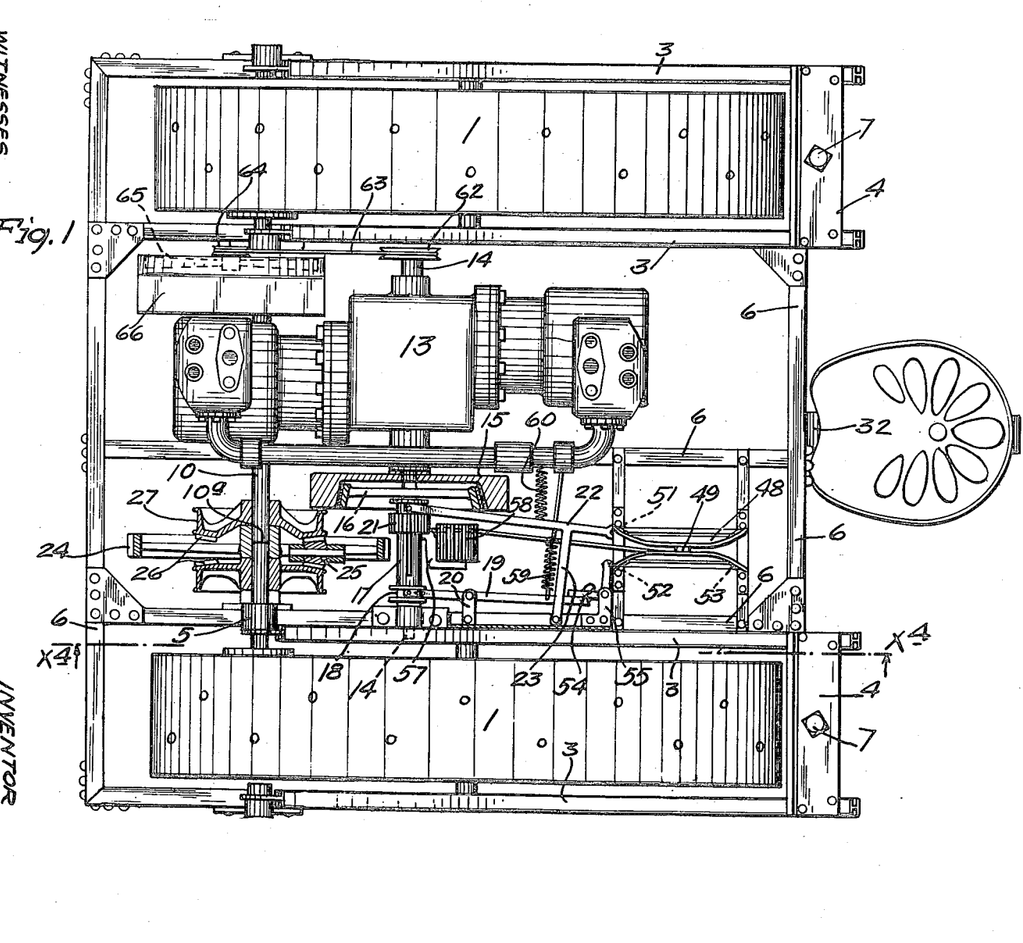
Figure 1 is a plan view of the improved tractor with some parts sectioned.

As shown in Fig. 1, the right hand end of the engine crank shaft 14 carries a pulley 62, and a belt 63 runs over this pulley and over the pulley 64 of a radiator-cooling fan 65, which fan coöperates with a radiator 66, suitably mounted on the framework 6.

Figure 9:
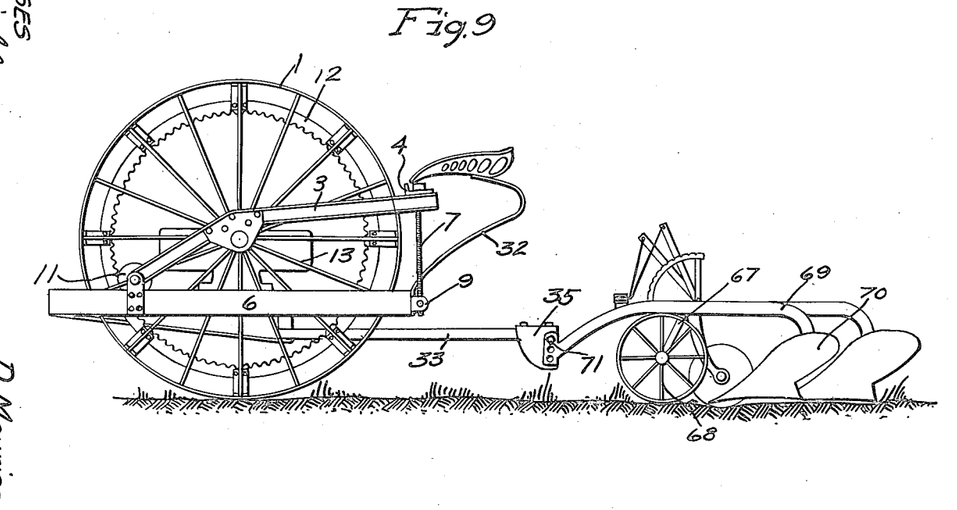
Fig. 9 is a side elevation showing the tractor connected to a gang plow of the sulky type.

In Fig. 9, the numerals 67, 68, 69 and 70 indicate, respectively, the crank axle, the wheels, the plow beams, and the plows of a sulky plow. The plow beams 69 are united to a common head 71 that is adjustably securable to the head 35 of the draw bar 33.

*Summary of operation.*—The main frame of the tractor may be vertically adjusted, so as to raise or lower the load. The load on the wheels of the tractor is always suspended below the axes thereof. The driving force of the engine, reacting against the traction wheels in the wheel-driving action, tends to throw the rear portion of the tractor frame downward. Hence, when the tractor is running only under its own load, and is not pulling a plow or other vehicle, the shoe 35 of the bar 33 will be thrown into engagement with the ground, under quite light pressure, but which, however, is sufficient to cause it to act as a rudder, by means of which the tractor may be steered by imparting oscillatory movements to the said bar 33, through manipulations of the steering post wheel 47. It will, of course, be understood that the shoe 35, when thus acting as a rudder, prevents the bar 33 from being moved laterally in respect to the ground, so that the traction wheels will be caused to run, one ahead of the other, and that the differential gear mechanism will permit the said traction wheels to be freely moved, one ahead of the other, under the above steering action.

When the tractor is hitched to a plow or wagon, or other load to be drawn by the tractor, the bar 33 may, depending on the distance above the ground of the coupling member of the implement to be drawn, be held up and the shoe 35 then be held out of contact with the ground; and the steering of the tractor may then be accomplished by manipulation of the friction brake devices alone, which operate to retard one or the other of the gears 26, and the sections of the shaft 10 of the differential gear mechanism. When the tractor is coupled to a plow, for example, the line of draft between the plow and the tractor frame is applied to the latter below the axes of the traction wheels, so that this draft strain acts in opposition to the wheel-driving strain, and, hence, tends to raise the rear portion of the tractor frame. By vertical adjustment of the main frame of the tractor, the front end of the draw bar 33 may be moved toward and from an oblique line extended from the axes of the traction wheels and the plows, and, consequently, by such adjustments, the tendency of the plow-driving force to raise the rear of the tractor frame may be varied. Also, such adjustments of the tractor frame vary the stability with which the tractor frame and its load will be suspended from the traction wheels.

The tractor may be steered either when drawing a plow or other vehicle, or when the rudder 35 is on the ground, either by manipulation of the traction clutch bands 28 or by manipulation of the steering post 46, or by simultaneously manipulating either of the clutch bands 28 and the steering post 46. However, the most powerful steering action is obtained by manipulation of the clutches, so as to directly operate upon the differential or compensating gear mechanism.

The tractor normally travels either on a straight line or on a curved line determined by the setting of the steering mechanism. It is important therefore, that the steering mechanism be held in the position to which it is adjusted to prevent accidental or wabbling movements of the tractor. When the direction of the tractor is to be changed by either of the steering devices, the operator with the form of lock here shown, steps upon the lever 42ª, thereby releasing the lock dog 43ª from the gear 43.

The tractor described is of very simple construction, and of extremely small cost. It is generally efficient for the purposes for which it is intended, has few parts to get out of order, and is very easily operated. In short, it meets a very great demand for a low-priced and efficient tractor for general agricultural purposes.

I have in the foregoing specification pointed out the best mode in which I contemplate applying the principle of my invention, but I do not limit myself to the details of the construction or arrangement of the elements herein shown and described or to the size and proportion of the parts illustrated, as the same may be varied in many particulars without departing from my invention, or from the scope of the claims herein.

What I claim is:

1. A tractor having two laterally spaced traction wheels, and a frame supported thereon and suspended with its center of gravity below the axis of said wheels, in combination with a pivotally supported and rearwardly located steering device, acting, by engagement with the surface of the ground, as a rudder to steer the tractor, and means for laterally adjusting said steering device and holding the same in its adjusted position.

2. A tractor having two laterally spaced traction wheels, and a frame pivotally suspended thereon with its center of gravity below the axis of said wheels, whereby it is normally gravity arighted, in combination with a pivoted rearwardly located steering device, and means for adjusting the steering device laterally in respect to the traction wheels and holding the same against lateral movement in its adjusted position, whereby the steering device is caused to operate as a rudder to steer the tractor.

3. A tractor having two laterally spaced traction wheels and a frame pivotally suspended thereon with its center of gravity below the axis of said wheels, whereby it is normally gravity-arighted, in combination with a rearwardly projected bar having a ground-engaging head, means for adjusting said bar laterally in respect to the traction wheels, whereby it is caused to operate as a rudder to steer the tractor, and means for holding said bar against lateral movements in respect to the traction wheels.

4. A tractor having two laterally spaced traction wheels and a frame suspended thereon with its center of gravity below the axis of said wheels, in combination with a pivoted rearwardly located steering device, means for adjusting said steering device laterally and holding it in its adjusted position, whereby the steering device is caused to operate as a rudder to steer the tractor, said traction wheels forming the only means for supporting the forward portion of said tractor.

5. A tractor having two laterally spaced traction wheels and a frame pivotally suspended thereon with its center of gravity below the axis of said wheels, whereby it is normally gravity-arighted, in combination with an engine on said tractor frame having connections for driving said traction wheels at the same or at different speeds, at will, a rearwardly projecting bar having a ground-engaging head, and means for adjusting said bar laterally in respect to said traction wheels, whereby it is caused to operate as a rudder to steer the tractor.

6. A tractor having two laterally spaced traction wheels, and a frame pivotally suspended thereon with its center of gravity below the axis of said wheels, in combination with an engine on said tractor frame having connections for driving said traction wheels at the same or at different speeds, at will, a pivoted rearwardly located steering device arranged to engage the surface of the ground and to act as a rudder to steer said tractor and means for adjusting said steering device laterally in respect to said traction wheels and holding the same in any position to which it may be adjusted.

7. A tractor having two laterally spaced traction wheels, and a frame suspended thereon with its center of gravity below the axis of said wheels, in combination with an engine supported on said frame with its weight substantially counterbalanced on the axis of the traction wheels, driving connections between said engine and the traction wheels for driving said traction wheels at the same or at different speeds, at will, a pivoted rearwardly located steering device acting, by engagement with the surface of the ground, as a rudder to steer the tractor, means for adjusting the steering device laterally and holding the same in any adjusted position, the counterbalancing of said engine upon the axis of the traction wheels bringing the principal weight of the traction mechanism on said wheels and a light weight only upon the steering device.

8. A tractor having two laterally spaced traction wheels, and a frame supported thereon, in combination with an engine supported on said frame and substantially counterbalanced on the axis of the traction wheels, driving connections between said engine and traction wheels including a differential gear mechanism, means for retarding, at will, the opposite sides of said differential gear mechanism, whereby the one traction wheel may be driven faster than the other, or at the same speed, said traction wheels forming the only means for supporting the forward portion of said tractor, and a steering device, acting, by engagement with the surface of the ground, as a rudder to steer the tractor.

9. A tractor having two laterally spaced traction wheels, and a frame supported thereon, in combination with an engine mounted on said frame and substantially counterbalanced on the axis of said traction wheels, driving connections between said engine and traction wheels including a differential gear mechanism, and means for retarding, at will, the opposite sides of said differential gear mechanism, whereby one traction wheel may be driven faster than the other, or both may be driven at the same speed, a pivoted rearwardly located steering device, acting, by engagement with the surface of the ground, as a rudder to steer the tractor, and means for adjusting the steering device laterally and holding the same in any adjusted position, said traction wheels forming the only means for supporting the forward portion of said tractor and the counterbalancing of said engine upon the axis of the wheels bringing the principal weight of the traction mechanism on said wheels and only a light weight upon the steering device.

10. A tractor having two laterally spaced traction wheels, and a frame pivotally suspended thereon with its center of gravity below the axis of said wheels, in combination with an engine on said tractor frame, a divided countershaft having its ends geared to said traction wheels, a master gear journaled on the divided countershaft and provided with a loosely journaled pinion, opposing beveled gears secured one on each section of said countershaft, both of said gears being engaged by said pinion and each gear being provided with a frictional brake flange or drum, a brake band surrounding each of said drums, means for tightening, at will, either or both the said brake bands, a driving connection between said engine and said master gear, and a steering device, acting, by engagement with the surface of the ground, as a rudder to steer the tractor.

11. A tractor having two laterally spaced traction wheels, and a frame pivotally suspended thereon with its center of gravity below the axis of said wheels, in combination with an engine on said tractor frame, a divided countershaft having its ends geared to said traction wheels, a master gear journaled on the divided countershaft and provided with a loosely journaled pinion, opposing beveled gears secured one on each section of said countershaft, both of said gears being engaged by said pinion and each gear being provided with a frictional brake flange or drum, a brake band surrounding each of said drums, means for tightening, at will, either or both the said brake bands, a driving connection between said engine and said master gear, and a pivoted rearwardly located steering device arranged to engage the surface of the ground and to act as a rudder for said tractor.

12. In a tractor, the combination with laterally spaced traction wheels and a main frame, of lifting levers, to the intermediate portion of which said wheels are journaled, pivotally connected at one end to the said main frame and adjustably connected to said main frame at their other ends.

13. In a tractor, the combination with laterally spaced traction wheels and a main frame, of lifting levers, to the intermediate portions of which said wheels are journaled, pivotally connected at one end to said main frame and adjustably connected to said main frame at their other ends, an engine on said main frame, connections between said engine and traction wheels including a differential gear mechanism, and brake devices operative on the opposite sides of said differential gear mechanism, whereby the said traction wheels may be driven at will, either at the same speed or at different speeds.

14. In a tractor, the combination with laterally spaced traction wheels and a main frame, of lifting levers, to the intermediate portion of which said wheels are journaled, pivotally connected at one end to said main frame and adjustably connected to said main frame at their other ends, a ground-engaging rudder projecting rearward from said main frame, and means for adjusting said rudder laterally in respect to the traction wheels.

15. In a tractor, the combination with laterally spaced traction wheels and a main frame, of lifting levers, to the intermediate portion of which said wheels are journaled, pivotally connected at one end of said main frame and adjustably connected to said main frame at their other ends, an engine on said main frame, connections between said engine and traction wheels including a differential gear mechanism, brake devices operative on the opposite sides of said differential gear mechanism, whereby the said traction wheels may be driven at will, either at the same speed or at different speeds, a bar connected to said main frame for lateral swinging movements, and provided at its rear end with a ground-engaging head adapting it to serve as a rudder, and a manually operated device having connections for adjusting said bar laterally.

In testimony whereof I affix my signature in presence of two witnesses.

D. MAURICE HARTSOUGH.

Witnesses:
C. G. PETERSON,
F. D. MERCHANT.